United States Patent [19]
Wetteborn

[11] Patent Number: 6,088,085
[45] Date of Patent: *Jul. 11, 2000

[54] RANGE MEASUREMENT APPARATUS

[75] Inventor: Hainer Wetteborn, Waldkirch, Germany

[73] Assignee: Sick AG, Waldkirch/Breisgau, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/018,598

[22] Filed: Feb. 4, 1998

[30] Foreign Application Priority Data

Feb. 5, 1997 [DE] Germany .............. 197 04 340

[51] Int. Cl.$^7$ .................................. G01C 3/08
[52] U.S. Cl. .................................. 356/5.01; 356/5.1
[58] Field of Search .................. 356/4.01, 5.01–5.15

[56] References Cited

U.S. PATENT DOCUMENTS

| | | |
|---|---|---|
| 3,619,058 | 11/1971 | Hewlett et al. . |
| 4,498,764 | 2/1985 | Bolkow et al. . |
| 4,521,107 | 6/1985 | Chaborski et al. . |
| 4,552,456 | 11/1985 | Endo . |
| 4,692,023 | 9/1987 | Ohtomo et al. . |
| 5,054,911 | 10/1991 | Ohishi . |
| 5,319,434 | 6/1994 | Croteau et al. . |

FOREIGN PATENT DOCUMENTS

| | | |
|---|---|---|
| 0493203A1 | 7/1992 | European Pat. Off. . |
| 238459 A1 | 8/1986 | German Dem. Rep. . |
| 3010137A1 | 9/1981 | Germany . |
| 9005121 U | 8/1990 | Germany . |
| 3710041C2 | 2/1991 | Germany . |
| 4109844C1 | 6/1992 | Germany . |
| 4439227C1 | 1/1996 | Germany . |
| 2183417A | 6/1987 | United Kingdom . |

OTHER PUBLICATIONS

Schwarte, R., "Performance capabilities of laser ranging sensors", in: *Proceedings of ESA Workshop on SPLAT* Mar. 25–30, 1984, Les Diablerets, CH, pp. 61–66.

*Primary Examiner*—Stephen C. Buczinski
*Attorney, Agent, or Firm*—Townsend and Townsend and Crew LLP

[57] ABSTRACT

The invention relates to a range measurement apparatus, in particular a single beam pulsed laser range finder, comprising a light transmitter, a light receiver, an optical attenuator disposed in the transmission or reception branch and a time measuring unit for determining the light transit time between the transmission and the receipt of a light signal. The light transmitter is formed as a unitary and compact module into which a laser diode, connection elements for the laser diodes, an apparatus for coupling out the reference pulse, and also a fiber plug connector for the coupling of the transmitted light into a light conducting fiber are integrated. The light receiver is likewise formed as a unitary and compact module into which a photodiode, connection elements for the photodiode, an apparatus for coupling in the reference pulse and also a fiber plug connector for the coupling in of the received light which takes place via a light conducting fiber are integrated.

32 Claims, 3 Drawing Sheets

RANGE MEASUREMENT APPARATUS

FIELD OF THE INVENTION

The invention relates to a range measurement apparatus, in particular a single beam pulsed laser range finder, comprising a light transmitter, a light receiver, an optical attenuator disposed in the transmission or reception branch, and a time measuring unit for determining the light transit time between the transmission and the reception of a light signal.

DESCRIPTION OF THE PRIOR ART

Known range measurement apparatuses of the named kind are often only capable of being manufactured at substantial cost. In particular, the known range measurement apparatuses do not always operate with the accuracy which is desirable in many applications.

OBJECT OF THE INVENTION

An object of the invention is to further develop a range measurement apparatus of the initially named kind in such a way that manufacturing costs can be reduced and so that its measurement accuracy and its exact reproducibility during manufacture can in particular be increased.

BRIEF DESCRIPTION OF THE INVENTION

This object is satisfied in accordance with the invention in that the light transmitter is formed as a unitary and compact module into which a laser diode, connection elements for the laser diodes, an apparatus for coupling out the reference pulse, and also a fiber plug connector for the coupling of the transmitted light into a light conducting fiber are integrated; and in that the light receiver is likewise formed as a unitary and compact module into which a photodiode, connection elements for the photodiode, an apparatus for coupling in the reference pulse and also a fiber plug connector for the coupling in of the received light which takes place via a light conducting fiber are integrated.

The range measurement apparatus of the invention is thus characterized in that all the components required for the production of the transmitted light, for the coupling out of the reference pulse and also for the coupling of the transmitted light into a glass fiber are combined into a single compact module. In just the same way, the components for the coupling in of the received light, the coupling in of the reference pulse and also the conversion of the coupled in light signals into electrical signals are combined into a unitary and compact receiver module.

The use of these two modules advantageously leads to simple handling and thus also to more rapid installation, and at the same time the size of the range measurement apparatus can be reduced. Moreover, complicated adjustment work during the installation of the range measurement apparatus is spared because the optical components of the transmitter module and of the receiver module are already firmly adjusted relative to one another within these modules, so that during installation of the range measurement apparatus no further work is any longer necessary in this respect.

Since, in accordance with the invention, both the light transmitter and also the light receiver are each equipped with a fiber plug connector, the optical system of the range measurement apparatus can be separated from its electronics without difficulties. The connection between the optics and the electronics can be produced in a simple manner by means of light conducting fibers which can be coupled to the said fiber plug connectors. This separation of the optical and electronic components is in particular of advantage if the range measurement apparatus of the invention is for example to be used in areas where the danger of explosion exists in which the presence of electronic components is problematic. In such applications the optical system can be arranged in the areas endangered by explosion and the electronics can be located outside of these regions.

In a preferred embodiment of the invention it is also possible to combine the transmitter module and the receiver module into a single module. In this case it is in advantageous manner no longer necessary to adjust the two modules relative to one another so that the reference pulse coupled out of the transmitter module is correctly coupled into the receiver module, because on combining both modules into a single module the individual components can already be arranged so that a correct coupling in of the reference pulse is ensured.

A particularly advantageous small size of the range measurement apparatus of the invention can be achieved when the transmitter module or the receiver module has a volume smaller than 1 cm$^3$, preferably smaller than 0.5 cm$^3$ and in particular a volume of approximately 0.2 cm$^3$.

It is furthermore of advantage when at least one lens, and in particular a collimator lens, is integrated into the transmitter module/receiver module in front of and/or behind the apparatus for the coupling out/coupling in of the reference pulse. Preferably just one collimator lens is provided both in front of and also behind the apparatus for the coupling out/coupling in of the reference pulse in both the transmitter module and the receiver module.

The transmitter module/receiver module of the invention can have a housing, in particular a stainless steel housing, in which the individual components of the respective module are held. This housing is preferably equipped with an aperture for the coupling out/coupling in of the reference pulse, so that a reference pulse can for example be directly coupled from the transmitter module into the receiver module. Consequently, no light conducting fiber is required for the transmission of the reference pulse, with it basically also being possible to transmit the reference pulse via such a light conducting fiber or also via a deflecting mirror.

The apparatus for the coupling out/coupling in of the reference pulse is realized in advantageous manner by a beam dividing mirror integrated into the respective module. It is preferred when this beam dividing mirror has in each case a high transmission. In particular the transmissivity of the beam dividing mirror can be more than 90%, in particular more than 95% and can in particular amount to between 97% and 99%. A high transmissivity of this kind brings about in advantageous manner a minimum energy loss during transmission and during reception of the light pulse which serves for the range measurement.

The laser diode of the transmitter module can be designed to produce laser pulses with a duration between 1 and 50 ns, preferably with a duration of approximately 3 ns at a power between 1 and 50 W, preferably at a power of approximately 10 W.

The photodiode of the receiver module is preferably formed as an avalanche photodiode which has a bandwidth between 20 and 500 MHz, and preferably a bandwidth of approximately 200 MHz.

The range measurement apparatus of the invention is, in particular, capable of a particularly accurate determination of the range to be measured when the time measurement unit that is used is designed to determine times in the PS range. It is preferred when the time measurement unit is designed in accordance with the applicant's German patent application filed on Jan. 31, 1997 with the title "Verfahren zur Bestimmung eines Zeitintervals zwischen zwei Ereignissen" (Method for the determination of the time interval between two events). The disclosure content of the last-named patent application is hereby expressly stated to belong to the content of the present patent application.

A particularly cost-favorable version of the range measurement apparatus of the invention can be achieved when only two separate time measurement devices are used in the context of the time measurement unit to determine the time intervals which will be described in the following.

It is of advantage when the optical attenuator is arranged in the reception branch of the range measurement apparatus between an optical receiving system and the receiver module. In this case it is ensured that the range measurement apparatus can always operate with full transmitter power because no attenuation takes place in the transmission branch.

The optical attenuator can be formed as a motor-driven diaphragm, in particular as a motor-driven cam disc or iris diaphragm. In the same way it is however possible to execute the optical attenuator as a micro-mechanical module, and for this a plurality of specific embodiments can be realized.

A particularly preferred embodiment of such a micro-mechanical module is present when the optical attenuator includes a mechanical setter, in particular a piezo-mechanical setter, for the shifting of a diaphragm which can be positioned between two oppositely disposed glass fiber ends.

A further preferred embodiment of the named micro-mechanical module consists of an optical attenuator which includes a mechanical setter, in particular a piezo-mechanical setter, for the shifting of two oppositely disposed glass fiber ends relative to one another.

A particularly fault-free operation of the range measurement apparatus in accordance with the invention is for example also possible when the optical attenuator is set so that the reference signal and the received signal have the same amplitude and/or the same pulse width.

In this respect the pulse width of the reference signal and of the received signal can be determined by means of the time measuring unit with the optical attenuator being adjusted until the two pulse widths are of the same size. In principle, two different methods offer themselves for the regulation of the pulse widths and/or amplitudes of the reference signal and the received signal:

On the one hand it is possible to determine, in the context of each transmitter pulse transmission, the time spacing of the reference pulse and of the received pulse and also the pulse widths of the reference pulse and of the received pulse. In the case of dissimilar pulse widths the optical attenuator is adjusted until the same pulse widths are detected in the subsequent pulse transmissions of the transmitter.

On the other hand, it is however also possible to determine the pulse widths of the reference pulse and the received pulse only for each nth pulse transmission of the transmitter, whereupon, with unequal pulse widths, the optical attenuator is then adjusted to produce the same pulse width. In this case, n can for example be >100 and can in particular be approximately equal to 1000.

When the reference pulse width and the received pulse width are only determined for every nth pulse transmission of the transmitter, then it is of advantage that the determination of the time interval of the reference pulse and the received pulse and the determination of the said pulse widths can take place using only two time measurement devices, which has a positive effect on the possibility of economically manufacturing the range measurement apparatus of the invention.

BRIEF DESCRIPTION OF THE DRAWINGS

The invention will be described in the following with reference to embodiments and to the following drawings.

DESCRIPTION OF THE PREFERRED EMBODIMENTS

Figure 1:
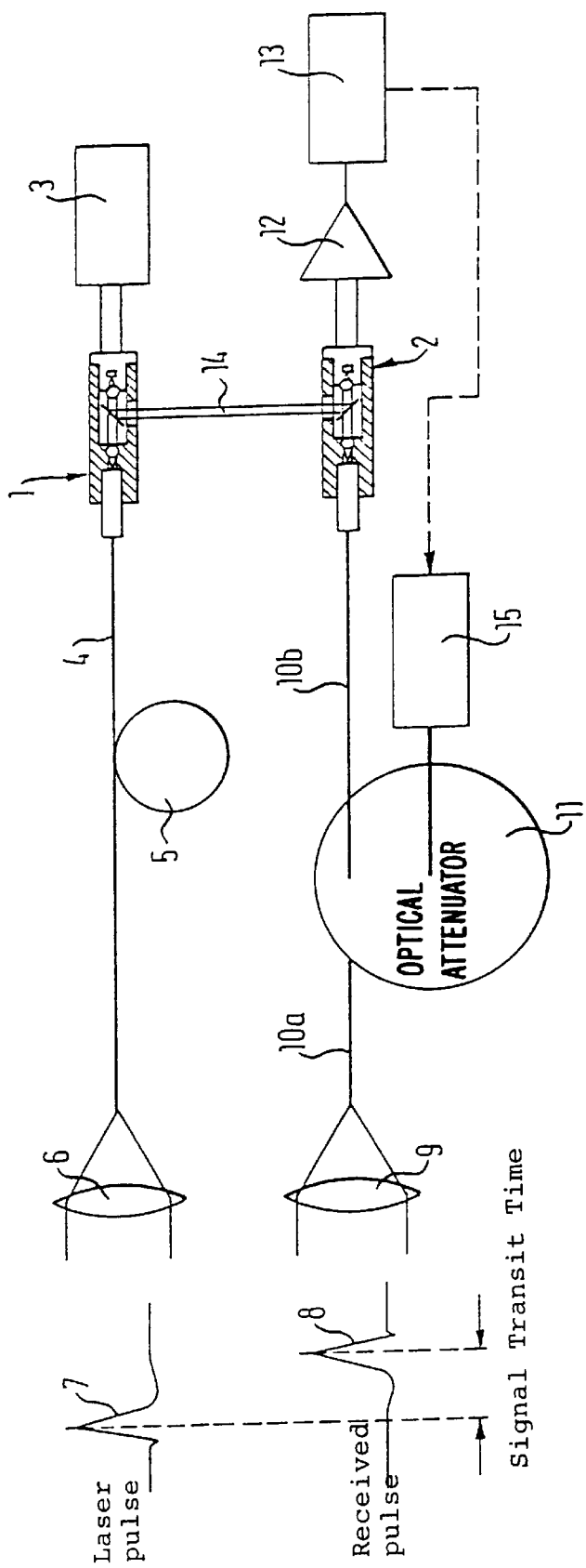
FIG. 1 is a block circuit diagram of a range measurement apparatus in accordance with the invention.

FIG. 1 shows a block circuit diagram of a range measurement apparatus in accordance with the invention with a transmitter module 1 and a receiver module 2. The detailed construction of the transmitter module 1 will be discussed in more detail in connection with FIG. 2.

The transmitter module 1 is energized by a control circuit 3 which in particular makes available pulse-like electrical signals which cause the production of transmitted light pulses in the transmitter module 1.

The light pulses produced in the transmitter module 1 pass via a glass fiber 4 to a unit 5 in which a delay of the light signal and also a mode mixing is produced. The output signal of the unit 5 then passes to a transmitter lens 6 from which a transmitted light pulse 7 is then transmitted in the direction of a reflecting object which is not shown in FIG. 1.

This object reflects the transmitted pulse 7 as a received pulse 8 back to the range measurement apparatus, where the received pulse 8 is coupled into a light conducting fiber 10 via a receiver lens 9.

The light conducting fiber 10 is interrupted in the region of an optical attenuator 11. By means of the optical attenuator 11 it is possible to set the amount of light which passes from the region 10a of the light conducting fiber into the region 10b of the light conducting fiber.

The received light passes via the region 10b of the light conducting fiber to the receiver module 2 which produces a corresponding electrical signal from the received light and conducts this on to a transimpedance amplifier 12.

The output signal of the transimpedance amplifier 12 is applied to a time measuring and evaluation unit 13 which is able to calculate the time spacing of pulses which are supplied to the unit 13. From these time spacings the time measuring and evaluation unit 13 can then draw a conclusion concerning the range between the range measurement apparatus and the reflecting object.

A reference light beam 14 is coupled out from the transmitter module 1 and is coupled in directly, without deflection and without the use of light conducting fibers into the receiver module 2.

The time measuring and evaluation unit 13 acts on the motor 15 which is designed to control the optical attenuator 11.

The control of the optical attenuator 11 by means of the motor 15 is always triggered when the width of the reference pulse 14 received by the unit 13 does not correspond with the width of the received pulse received via the light conducting fibers 10a, 10b. The motor is in this respect energized by the unit 13 until the two said widths correspond.

Figure 2:
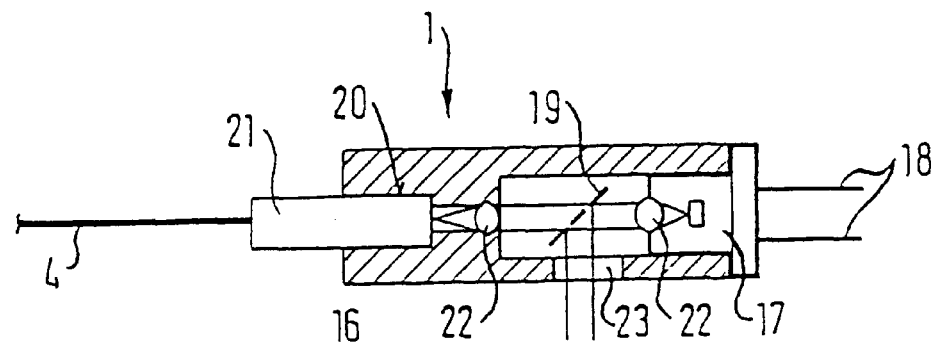
FIG. 2 is an enlarged illustration of a transmitter module.

FIG. 2 shows in detail the construction of the transmitter module 1.

A laser diode 17 is embedded at one end face into a substantially cylindrical housing 16 of stainless steel. The laser diode 17 has at its side remote from the housing 16 two electrical connection contacts 18.

In the housing 16 a beam dividing mirror 19 is arranged at an angle of approximately 45° to the optical axis in the region of the optical axis of the laser diode 17. The beam dividing mirror 19 has—as already described—a very high degree of transmission, so that light extending along the optical axis of the laser diode 17 can pass largely unhindered through the beam dividing mirror 19.

At the side of the beam dividing mirror 19 remote from the laser diode there is provided a mount 20 for a fiber plug connector 21 which couples the light produced by the laser diode 17 into a light conducting fiber 4.

In each case a collimator lens 22 is provided between the beam dividing mirror 19 and the fiber plug connector 21 and also between the beam dividing mirror 19 and the laser diode 17.

The housing 16 is provided with an aperture 23 in the region of the beam dividing mirror 19 via which a small part of the light transmitted by the laser diode is coupled out as a reference pulse. The aperture 23 thereby extends perpendicular to the optical axis of the laser diode 17.

The laser diode 17, beam dividing mirror 19 and collimator lenses 22 are fixedly connected to the housing 16, whereas the fiber plug connector 21 is releasably connected to the housing 16.

The receiver module 2 is constructed similarly to the transmitter module 1 shown in FIG. 2. A distinction exists solely in the fact that instead of the laser diode 17 a correspondingly designed photodiode is used, the beam divider mirror 19 is displaced through 90° relative to the position shown in FIG. 2 (see FIG. 1) and the aperture 23 is not located beneath the beam divider mirror 19 as shown in FIG. 2, but rather above the beam divider mirror 19, as can also be seen from FIG. 1.

Figure 3:
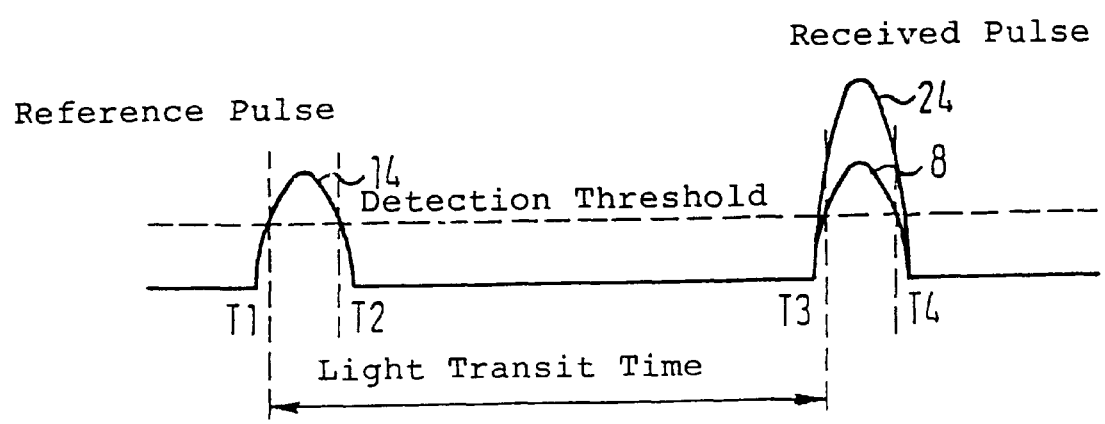
FIG. 3 is a possible time plot for the reference pulse and a transmitter pulse.

FIG. 3 shows schematically those pulses which are received by the time measuring and evaluation unit 13 in accordance with FIG. 1.

First of all, the reference pulse 14 (FIG. 1) is received. At the time T1 this reference pulse 14 exceeds a preset detection threshold and at the time T2 it in turn falls short of this detection threshold.

The unit 13 then receives the received pulse 8 (FIG. 1) which is displaced timewise by the light transit time which the transmitted laser pulse 7 (FIG. 1) requires from the range measurement apparatus to the reflecting object and back again. At the time point T3 the received pulse exceeds the said detection threshold and at the time point T4 it in turn falls beneath it.

The light transit time thus corresponds to the time difference T3–T1.

If the received pulse 8 has an amplitude which is too high, or a width which is too large, as is illustrated in FIG. 3 by the pulse 24, then the motor 15 is set in motion via the time measuring and evaluation unit 13 and the optical attenuator 11 is set so that the received pulse 24 is attenuated so strongly that it has the same amplitude or the same width as the reference pulse 14.

This regulation of the amplitude of the received pulse is preferably brought about in that the widths of the received pulses are measured rather than their amplitudes. The width of the reference pulse thereby corresponds to the difference T2–T1, whereas the width of the received pulse corresponds to the difference T4–T3. The optical attenuator must consequently only be set in such a way that the two differences T2–T1 and T3–T4 are of the same size.

Figure 5:
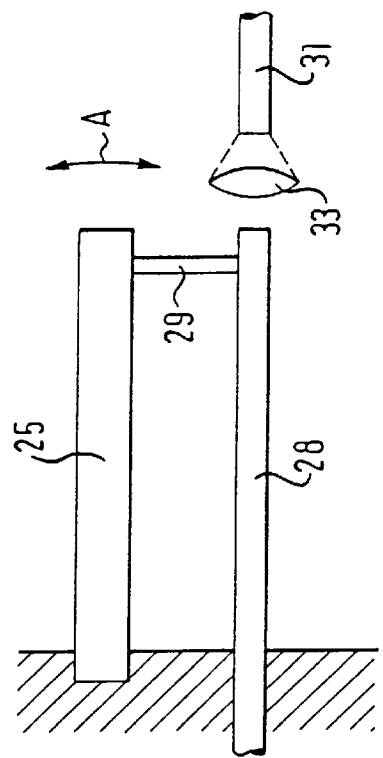
FIG. 5 shows a second possible embodiment of an optical attenuator formed as a micro-mechanical module.
Figure 4:
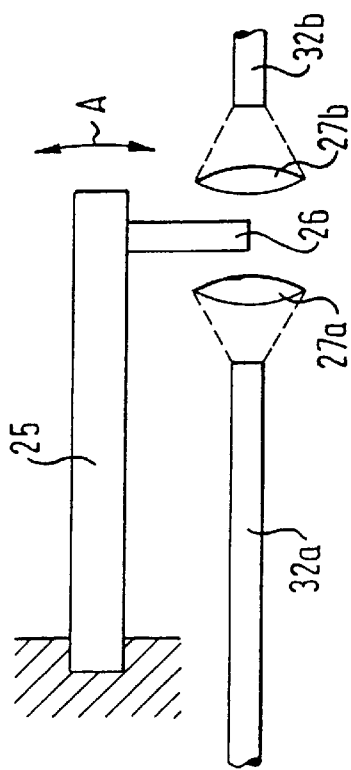
FIG. 4 shows a first possible embodiment of an optical attenuator formed as a micro-mechanical module.

FIGS. 4 and 5 show two embodiments of optical attenuators which are formed as micro-mechanical modules. FIG. 4 shows a piezo-mechanical setter 25 which is fixedly mounted at its one end and can be bent by the application of a voltage in the direction of the arrow A.

At the free end of the piezo-mechanical setter 25 there is provided a downwardly projecting diaphragm 26 which extends between two oppositely disposed lenses 27a, 27b. The lenses 27a, 27b are in each case arranged adjacent to and spaced from the ends of two glass fibers 32a, 32b and enlarge the optically effective region of the mutually confronting end faces of the two glass fibers 32a, 32b. The two lenses 27a, 27b and also the two glass fibers 32a, 32b are fixedly and immovably mounted.

Through a bending of the piezo-mechanical setter 25, the diaphragm 26 can be moved out of the region between the two lenses 27a, 27b or further into this region. In this manner an attenuation of the light which is transmitted from one fiber 32a to the other fiber 32b can be selectively achieved.

Instead of using the diaphragm 26, a horizontally aligned glass fiber section could also be used, which can be moved upwardly and downwardly in the vertical direction between the two lenses 27a, 27b, or between the two ends of the glass fibers 32a, 32b, by means of the setter 25.

An alternative embodiment of an optical attenuator is shown in FIG. 5. Here, a piezo-mechanical setting device 25 is also present which is fixedly mounted at its one end.

A glass fiber 28 is likewise fixedly mounted at one end and extends substantially parallel to the piezo-mechanical setter 25. The glass fiber 28 and also the piezo-mechanical setter 25 are connected together in the region of their free ends by means of a suitable means 29.

The piezo-mechanical setter 25 can be bent along the arrow A by the application of a voltage.

A further glass fiber 31 is located opposite to the free end of the glass fiber 28 and is fixedly and immovably mounted. A lens 33 is provided adjacent to and spaced from the end face of the glass fiber 31 and enlarges the optically effective region of the end face of the glass fiber 31.

By bending of the piezo-mechanical setter 25 a situation can be achieved in which the free end of the glass fiber 28 is moved out of the region of the lens 33, whereby the quantity of light transmitted from the glass fiber 28 into the glass fiber 31 can be selectively reduced.

The broadening of the effective region of the end face of the glass fiber 31 by the lens 33 is sensible in order to be able to carry out adjustment work during the installation of the optical attenuator with little effort. In place of the lens 33 a glass fiber could likewise be used which has a larger cross-section than the glass fiber 28. The adjustment effort would also be reduced in this way.

What is claimed is:

1. Range measuring apparatus comprising a light transmitter module including a source of laser light; a light receiver module which is separate of the light transmitter module and includes a photosensor for detecting light; a light conducting fiber arrangement optically coupling the modules by conducting light from the transmitter module to a light output and by conducting light, coming from the output and reflected by an object, from a light input to the receiver module; a reference beam generator disposed between the light source and the fiber arrangement generating a reference light beam by dividing light emanating from the light source into a major portion forming light which is directed to the fiber arrangement, and a minor portion forming the reference light beam, and including an arrangement operatively coupled with the reference beam generator and the photosensor for directing the reference beam from the reference beam generator to the photosensor along a path which is unobstructed in a region between the transmitter module and the receiver module, the receiver module being a receiver of the reference light beam; a time measuring unit for determining a transit time for light emitted by the light source and detected by the photosensor; and an optical attenuator for changing a characteristic of the light conducted through the fiber arrangement; whereby the reference light beam can be used for changing the characteristic of the light detected by the photosensor.

2. Range measurement apparatus in accordance with claim 1 wherein at least one of the transmitter module and the receiver module has a volume smaller than 1 cm$^3$.

3. Range measurement apparatus in accordance with claim 1 including at least one collimator lens integrated into the transmitter module and the receiver module and arranged so that the reference beam bypasses the collimator lens.

4. Range measurement apparatus in accordance with claim 1 wherein the transmitter module and the receiver module each has a stainless steel housing in which the laser source and the photosensor, respectively, are held.

5. Range measurement apparatus in accordance with claim 4 wherein the housing has an aperture which is arranged to permit passage of the reference beam therethrough.

6. Range measurement apparatus in accordance with claim 1 wherein the reference beam generator comprises an optical beam splitter for generating the reference beam.

7. Range measurement apparatus in accordance with claim 6 wherein the beam splitter has a light transmission ratio of more than 90%.

8. Range measurement apparatus in accordance with claim 1 wherein the laser source comprises a laser diode capable of producing laser pulses with a duration between 1 and 50 ns.

9. Range measurement apparatus in accordance with claim 1 wherein the photosensor comprises an avalanche photodiode with a bandwidth between 20 and 500 MHz.

10. Range measurement apparatus in accordance with claim 1 wherein the time measurement unit determines time in the ps range.

11. Range measurement apparatus in accordance with claim 1 wherein the time measurement unit includes two time measurement devices.

12. Range measurement apparatus in accordance with claim 1 wherein the fiber arrangement comprises a light transmitting fiber branch and a light receiving fiber branch including an optical receiving system, and wherein the optical attenuator is arranged in the light receiving branch between the optical receiving system and the receiver module.

13. Range measurement apparatus in accordance with claim 1 wherein the optical attenuator comprises a motor-driven diaphragm.

14. Range measurement apparatus in accordance with claim 1 wherein the optical attenuator comprises a micromechanical component group.

15. Range measurement apparatus in accordance with claim 14 wherein the optical attenuator includes a piezomechanical setting device with a diaphragm positioned between oppositely disposed light conducting fiber ends.

16. Range measurement apparatus in accordance with claim 14 wherein the optical attenuator includes a piezomechanical setting device which shifts two oppositely disposed glass fiber ends relative to one another.

17. Range measurement apparatus in accordance with claim 2 wherein the volume of the modules is smaller than 0.5 cm$^3$.

18. Range measurement apparatus in accordance with claim 17 wherein the volume is approximately 0.2 cm$^3$.

19. Range measurement apparatus in accordance with claim 7 wherein the light transmission ratio of the beam splitter is more than 95%.

20. Range measurement apparatus in accordance with claim 19 wherein the light transmission ratio of the beam splitter is between 97% and 99%.

21. Range measurement apparatus in accordance with claim 8 wherein the laser pulses have a duration of approximately 3 ns at a power between 1 and 50 W.

22. Range measurement apparatus in accordance with claim 21 wherein the power of the laser pulses is approximately 10 W.

23. Range measurement apparatus in accordance with claim 9 wherein the photodiode has a bandwidth of approximately 200 MHz.

24. Method for operating a range measurement apparatus comprising a light transmitter module including a source of laser light; a light receiver module which is separate of the light transmitter module and includes a photosensor for detecting light; a light conducting fiber arrangement optically coupling the modules by conducting light from the transmitter module to transmitter optics and by conducting light, which is output by the transmitter optics and reflected by an object, from receiver optics to the receiver module; a reference beam generator disposed between the light source and the fiber arrangement generating a reference light beam by dividing light emanating from the light source with a beam splitter into a major portion forming light which is directed to the fiber arrangement, and a minor portion forming the reference light beam, and including an arrangement, operatively coupled with the reference beam generator and the photosensor for directing the reference beam from the reference beam generator to the photosensor along a path which is unobstructed in a region between the transmitter module and the receiver module, the receiver module being a receiver of the reference light beam; a time measuring unit for determining a transit time for light emitted by the laser source and detected by the photosensor; and an optical attenuator for changing a characteristic of the light conducted through the fiber arrangement; the method comprising pulsing the light from the light source, generating first and second signals from pulses of the light that is conducted through the fiber arrangement and the reference light beam, respectively, which reflect at least one of an amplitude and a pulse width of the respective light pulses, and setting the optical attenuator so that the amplitudes and/or pulse widths of the first and second signals are the same.

25. Method according to claim 24 including determining the pulse width of the first and second signals with the time measurement unit, and adjusting the optical attenuator until the pulse widths of the first and second signals are the same.

26. Method in accordance with claim 25 including determining a time spacing and a pulse width for the reference pulse and the received pulse.

27. Method in accordance with claim 26 wherein the step of adjusting the optical attenuator comprises adjusting it so that the first and second signals have the same pulse width.

28. Method according to claim 25 comprising determining the pulse width of the first and second signals for every nth pulse transmission by the transmitting unit, and, upon detecting dissimilar pulse widths, adjusting the optical attenuator until the first and second signals have the same pulse widths.

29. Method according to claim 28 wherein n is larger than 100.

30. Method according to claim 29 wherein n approximately equals 1000.

31. Method according to claim 28 comprising providing two time measurement devices, and with the two time measurement devices determining at least one of the time spacing and the pulse widths of the first and second signals with the two time measurement devices only.

32. A method of operating a range measurement apparatus having a light transmitter module including a laser diode for generating a pulsed light beam; a light receiver module including a photosensor for receiving light; a light conducting fiber arrangement operatively coupling the modules by conducting pulsed light from the transmitter module to transmitter optics and by conducting light, which is output by the transmitter optics and reflected by an object, from a receiver optics to the receiver module; and an attenuator for adjusting at least one of an amplitude and a pulse width of the light pulses received by the photosensor, the method comprising the steps of generating a reference light beam in the transmitter module by dividing pulsed light emanating from the light source into a major portion forming light which is directed to the fiber arrangement, and a minor portion forming the reference light beam and sending the reference light beam from the reference beam generator to the photosensor along a path which is unobstructed in a region between the transmitter module and the receiver module, receiving the reference light beam in the receiver module, comparing signals generated from the reference light beam received in the transmitter module with signals generated from pulsed light received by the receiver optics, and adjusting the optical attenuator until the signals generated from light received by the receiver optics have at least one of an amplitude and a pulse width which equals an amplitude and/or a pulse width of the signals generated from the reference light beam.

* * * * *